United States Patent
Sweeney, II

(10) Patent No.: US 7,132,948 B2
(45) Date of Patent: Nov. 7, 2006

(54) SYSTEM FOR OPTIMALLY PLACING RADIO FREQUENCY IDENTIFICATION (RFID) ANTENNAS, TAGS, AND INTERROGATORS

(75) Inventor: Patrick Joseph Sweeney, II, Philomont, VA (US)

(73) Assignee: Odin Technologies, Inc., Dulles, VA (US)

( * ) Notice: Subject to any disclaimer, the term of this patent is extended or adjusted under 35 U.S.C. 154(b) by 184 days.

(21) Appl. No.: 10/905,839

(22) Filed: Jan. 22, 2005

(65) Prior Publication Data

US 2006/0170555 A1 Aug. 3, 2006

(51) Int. Cl.
- *G08B 13/14* (2006.01)
- *G08B 29/00* (2006.01)
- *G01B 7/14* (2006.01)
- *H01Q 9/30* (2006.01)

(52) U.S. Cl. .............................. 340/572.7; 340/572.1; 340/572.5; 340/572.8; 340/514; 340/515; 340/516; 324/207.11; 324/207.12; 324/207.13; 324/207.14; 324/207.15; 343/749; 343/750; 343/831; 343/893

(58) Field of Classification Search ............. 340/572.1, 340/572.5, 572.7, 10.42, 514, 515, 516; 324/207.11, 324/207.12, 207.13; 343/749–893
See application file for complete search history.

(56) References Cited

U.S. PATENT DOCUMENTS

| | | | |
|---|---|---|---|
| 5,929,760 A | 7/1999 | Monahan | |
| 5,999,861 A | 12/1999 | Dove et al. | |
| 6,104,291 A * | 8/2000 | Beauvillier et al. | 340/572.1 |
| 6,700,547 B1 * | 3/2004 | Mejia et al. | 343/743 |
| 6,771,399 B1 | 8/2004 | Batten | |
| 7,084,740 B1 * | 8/2006 | Bridgelall | 340/10.42 |
| 2005/0212660 A1 * | 9/2005 | Hansen et al. | 340/10.3 |
| 2005/0242958 A1 * | 11/2005 | Lyon et al. | 340/572.7 |

* cited by examiner

*Primary Examiner*—Daniel Wu
*Assistant Examiner*—Lam Pham
(74) *Attorney, Agent, or Firm*—Bass Law Group; James O. Bass

(57) ABSTRACT

A system and method for optimally placing radio frequency identification (RFID) antennas. The system varies the placement of RFID tag and interrogator antennas with respect to each other and a stationary object or objects. A signal generator sends a known reference signal to the one or more RFID interrogator antennas. The signal is received by the one or more RFID tag antennas and is displayed upon an oscilloscope, spectrum analyzer or other multipurpose signal measuring device. By this method, the system finds the optimal placement of the antennas with respect to each other and the object or objects.

6 Claims, 4 Drawing Sheets

SYSTEM FOR OPTIMALLY PLACING RADIO FREQUENCY IDENTIFICATION (RFID) ANTENNAS, TAGS, AND INTERROGATORS

BACKGROUND OF INVENTION

Radio frequency identification (RFID) systems allow for the identification of objects at a distance and out of line of sight. They are comprised of transponders called radio frequency (RF) tags and RF interrogators (also called readers). The tags are generally smaller and less expensive than interrogators, and are commonly attached to objects such as product packages in stores. When an interrogator comes within range of an RF tag, it may provide power to the tag via a querying signal, or the RF tag may use stored power from a battery or capacitor to send a radio frequency signal to be read by the RFID interrogator.

RF tags may consist of single integrated circuits, circuits and antennas, or may incorporate more complex capabilities such as computation, data storage, and sensing means. Some categories of RFID tags include the following: passive tags that acquire power via the electromagnetic field emitted by the interrogator, semi-passive tags that respond similarly, but also use on-board stored power for other functions, active tags that use their own stored power to respond to an interrogator's signal, inductively coupled tags that operate at low frequencies and short distances via a coil antenna, single or dipole antenna-equipped tags that operate at higher frequencies and longer distances, read-write tags that can alter data stored upon them, full-duplex or half duplex tags, collision arbitration tags that may be read in groups, or non-collision tags that must be read individually.

RFID systems consist of RFID tags, RFID interrogators and middleware computing devices. Downstream processing of RFID signal information such as EPC numbers, GTINs, or UID numbers usually occurs in two stages. Tag responses are and converted to a standard packet form by the reader and sent to the middleware device. The middleware device is responsible for processing the raw information into a useful form. For instance, a reader may send many identical packets when a tag attached to an object moves along a conveyor belt past an interrogator. The middleware reduces the chatter of the interrogator to a concise and structured stream of unique packets. These packets are then typically sent to an enterprise application that actually processes the data. Examples of such applications include those that perform inventory management, supply chain management and analysis, or purchase and backorder handling.

RFID systems present a number of advantages over other object marking and tracking systems. A radio frequency interrogator may be able to read a tag when it is not in line of sight from the interrogator, when the tag is dirty, or when a container encloses the tag. RFID systems may identify objects at greater distances than optical systems, may store information into read/write tags, may operate unattended, and may read tags hidden from visual inspection for security purposes. These advantages make RFID systems useful for tracking objects. They are being adopted for use in retail stores, airports, warehouses, postal facilities, and many other locations. RFID systems will likely be more widely adopted as the price of tags and interrogators decreases.

As organizations strive to adopt RFID systems for tracking objects, they face challenges imposed by the nature of the objects they handle and the environments in which those objects are processed. Radio frequency signals are reflected, refracted, or absorbed by many building, packaging, or object materials. Moving people, vehicles, weather and ambient electromagnetic radiation can also effect the performance of RFID systems. Compounding the situation is a growing diversity of choices among RFID systems and components with dimensions such as cost, range, and power consumption. An RFID tag may deliver varying performance depending upon its orientation and location upon or within a package, its distance from a reader and the frequency at which it operates. Often companies must purchase and evaluate systems through trial and error, a time-consuming and costly process. Radio frequency design and testing software, RF site surveys and prototype systems can assist the process, but these approaches do not address the problem of complex object materials, changing object materials, and the wide variety of RFID tags available. For instance, when an RFID tag with antenna is placed upon a case containing a variety of objects, the objects may affect the reception of the tag's antenna. Moving the tag to another location on the case can determine whether the tag will successfully receive and respond to an RFID interrogator's signal. A need exists for a system that exhaustively and efficiently tests a wide variety of RFID antenna configurations to determine optimal placement of the antenna or antennas with respect to an RFID interrogator antenna or antennas and an object or objects.

U.S. Pat. No. 6,771,399 discloses a system, method and apparatus for translating a carriage from one position to another position utilizing an injection molded plastic translating system The apparatus differs from this invention in that solves the problem of moving by means of a radio-wave-transparent material, but it does not address the problem of placing antennas with respect to one another and objects within their environment.

U.S. Pat. No. 6,104,291 discloses a method and apparatus for simulating physical fields. The apparatus differs from this invention in that it addresses issues of integrated circuit interface. It simulates high frequency effects for the design of on-chip interconnect structures.

U.S. Pat. No. 5,999,861 discloses a method and apparatus for testing RFID tags. The apparatus differs from this invention in that while it moves RFID tags with respect to an RFID interrogator, it does not find optimal placement of antennas, but simply tests the performance of a number of tags within the same interrogator field.

U.S. Pat. No. 5,929,760 discloses an RFID conveyor antenna system in which tags are moved along a conveyor belt past an RFID interrogator. The method differs from this invention in that it does not does not determine the optimal placement of RFID tag antennas with respect to interrogators or objects.

SUMMARY OF INVENTION

This invention relates to a method and system for optimally placing radio frequency identification (RFID) antennas. The apparatus comprises an antenna carriage assembly, a signal generator, a spectrum analyzer, and two or more antennas. The antenna carriage assembly allows for precise movement and placement of an antenna with respect to an object and a second antenna. The signal generator sends a known signal to the second antenna and the spectrum analyzer presents the signal as the first antenna receives it. By varying the position of objects about the first antenna and the location and orientation of the first antenna with respect to the second antenna, a user of the system may make a determination of the optimal placement of the antenna with respect to objects and the second antenna.

The antenna carriage assembly holds one or more RFID tag antennas at a known position and orientation with respect to one or more RFID interrogator antennas and one or more objects. The signal generator transmits a reference signal of known characteristics to the one or more RFID interrogator antennas. One or more signal measuring devices such as oscilloscopes, spectrum analyzers, or multi-purpose signal measuring devices, connected to the one or more RFID interrogator antennas is held by the antenna carriage assembly so that the received signal may be examined to determine the optimal placement of the one or more RFID tag antennas with respect to the one or more RFID interrogator antennas and the one or more objects.

The foregoing general description and the following detailed description are exemplary and explanatory only and do not restrict the claims directed to the invention. The accompanying drawings, which are incorporated in and constitute a part of this specification, illustrate some embodiments of the invention and together with the description, serve to explain the principles of the invention but not limit the claims or concept of the invention.

DETAILED DESCRIPTION

The following detailed description of preferred embodiments of this invention and the attached figures are intended to provide a clear description of the invention without limiting its scope.

Figure 1:
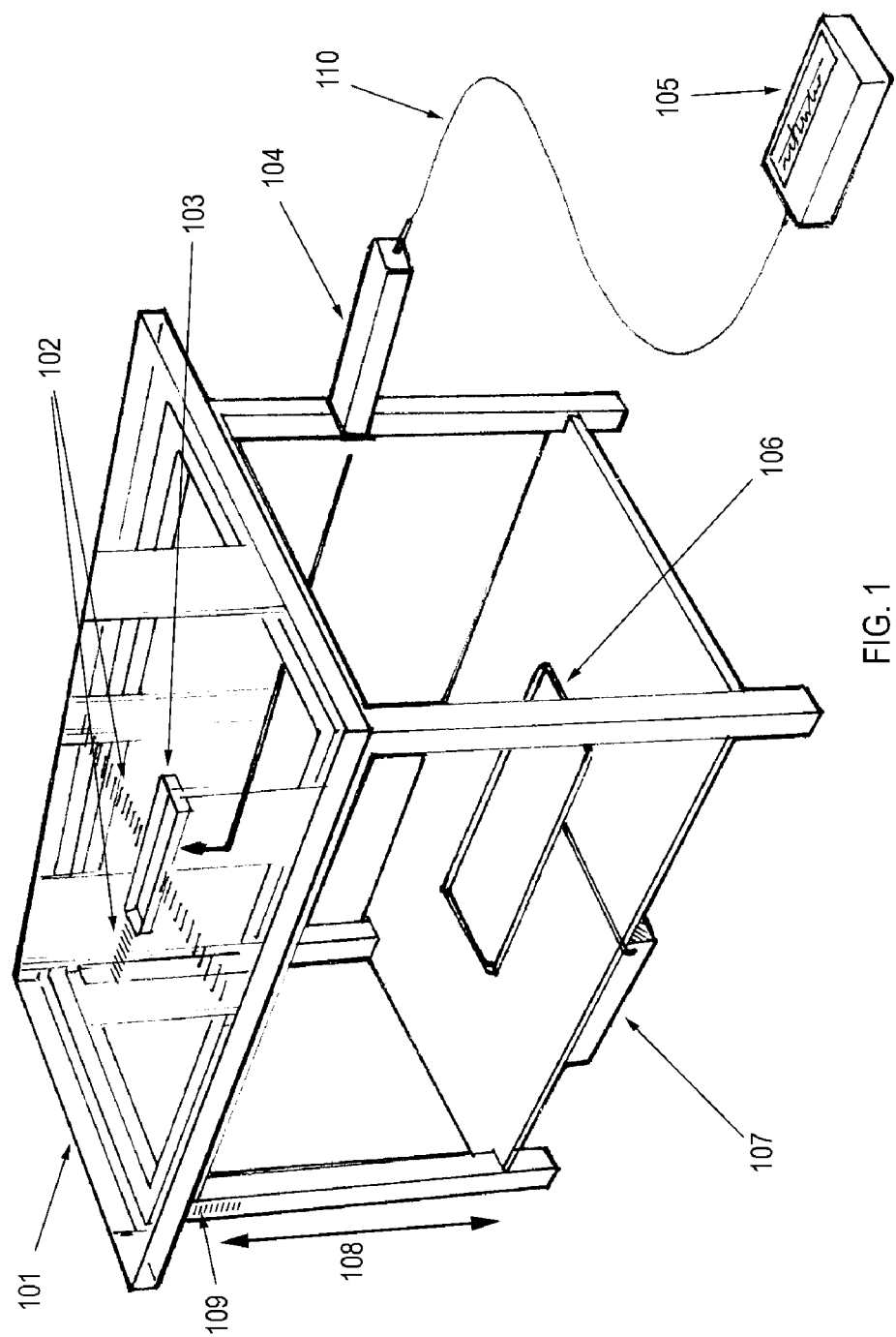
FIG. 1 is a diagram illustrating the overall structure of an embodiment of the system on which cases or other objects to be tagged are placed.

FIG. 1 is a diagram illustrating the overall structure of an embodiment of the system on which cases or other objects to be tagged are placed. Antenna carriage assembly 101 is made of materials such as acrylic plastic that are relatively transparent to radio waves in the frequency of the RFID tags and interrogators to be tested. The upper surface of antenna carriage assembly 101 and other components may also be constructed of materials transparent to visible light to facilitate the observation and measurement of the size and position of objects upon the carriage and the antennas 104 and 106. The antenna carriage assembly top may be moved up and down along line 108 and fixed at various positions denoted by registration marks 109. Moving the antenna carriage assembly top along line 108 changes the distance between antenna carriage 104 when affixed to slot 103 and RFID interrogator antenna 106, without changing the distance or orientation of objects upon the carriage with respect to antenna carriage 104. An object to be tagged can be placed upon the carriage top and may be moved horizontally and measured against registration marks 102. Slot 103 holds antenna carriage 104 in place. Many different RFID tags or RFID tag antenna may be mounted in multiple antenna carriages of the same dimensions as antenna carriage 104. To test a different RFID antenna or RFID tag, a user of the system can detach antenna carriage 104 and its associated antenna or tag and replace it with another. Signal generator 107 transmits a known reference signal to RFID interrogator antenna 106. The RFID antenna within antenna carriage 104, generally affixed within antenna slot 103, then receives the signal broadcast by 106 and communicates it via wire 110 to signal analyzer 105. A user examining the signal appearing upon the display of signal analyzer 105 can thereby determine how it differs from the reference signal as a result of the placement of antenna carriage 104 with respect to antenna 106 and any objects upon carriage 101. By methodically moving an object about carriage 101, a user of the system may determine the optimal placement of an antenna with respect to an object and the optimal choice of an antenna to achieve the desired signal within an RFID tag.

Figure 2:
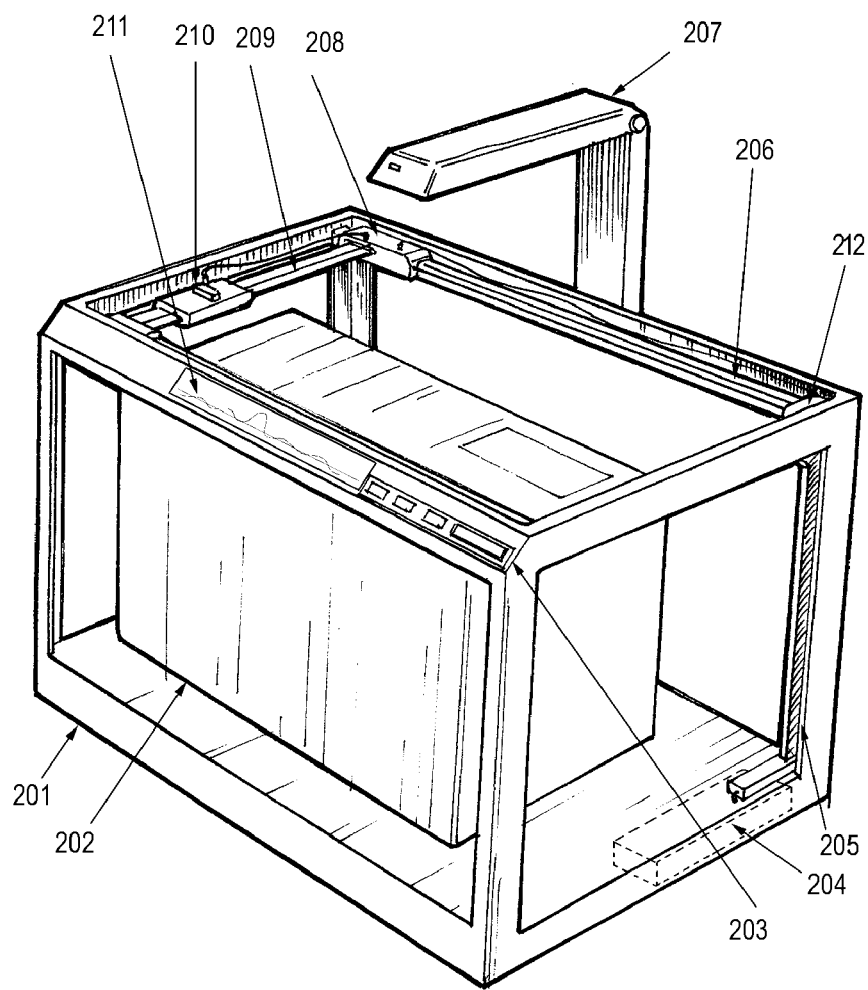
FIG. 2 is a diagram illustrating the overall structure of an embodiment of the system that moves the key elements automatically.

FIG. 2 is a diagram illustrating the overall structure of an embodiment of the system that moves the key elements automatically. Antenna carriage assembly 201 supports the system's moving components and object 202. User interface 203 allows for control of the system's operation. In a typical operating session, a user places an object 202 within frame 201. Issuing commands via user interface 203, the user initiates a scan of the object. Signal generator 204 transmits a known reference signal to the RFID interrogator antenna or antennas within antenna carriage 207. The signal is received by the RFID tag antenna or antennas within antenna carriage 210 and is conducted to the oscilloscope, spectrum analyzer or other multipurpose signal measuring device which displays the received signal upon display 211. The reference signal may also be displayed upon 211 for comparison. To perform an automated scan of up to three sides of the object within the antenna carriage assembly, the carriage 210, moves along arm 209. Carriage 210 and arm 209 may move perpendicularly along arm 206 via carriage 208. To move vertically, carriage 210, arm 209, carriage 208 and arm 206 may move along arm 205 via carriage 212. Additionally, carriage 207 may move with respect to the antenna carriage assembly. The RFID tag antenna within carriage 210 may be replaced to test other types of RFID tag antennas. The RFID interrogator antenna within carriage 207 may also be replaced with an antenna or antennas of different specifications. Moving carriages 207, 208, 210, and 212 and arms 206 and 209 incrementally, the system can make a determination of the optimal placement of an RFID tag antenna within carriage 210 and with respect to the RFID interrogator antenna or antennas within 207 and the object 202.

Figure 3:
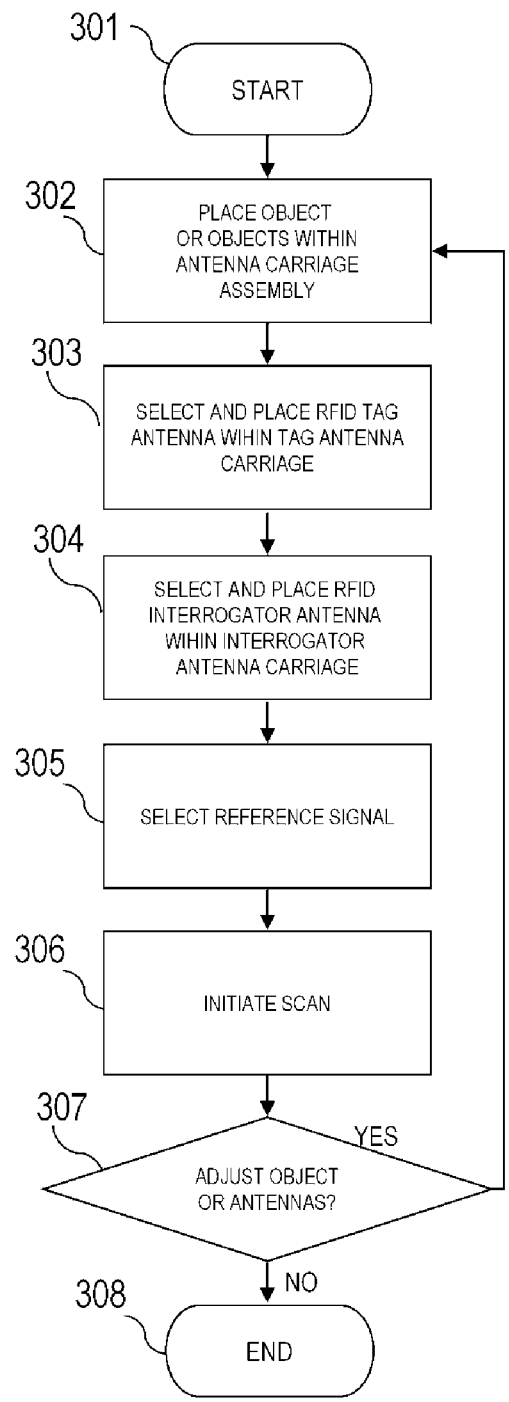
FIG. 3 is a flow chart illustrating the method by which the embodiment of FIG. 2 is used.

FIG. 3 is a flow chart illustrating the method by which the embodiment of FIG. 2 is used. The method starts at 301. At step 302, the user places an object or objects within the antenna carriage assembly. At step 303, the user selects and places the RFID tag antenna or antennas within the tag antenna carriage. At step 304, the user selects and places the RFID interrogator antenna within the interrogator antenna carriage. At step 305, the user selects a reference signal. At step 306, the user initiates the scan for optimal antenna placement. After the scan, the user may select at step 307 to make adjustments to the object or objects, or to change the antennas. If so, the method is started again at step 302, otherwise, the method has reached completion at step 308.

Figure 4:
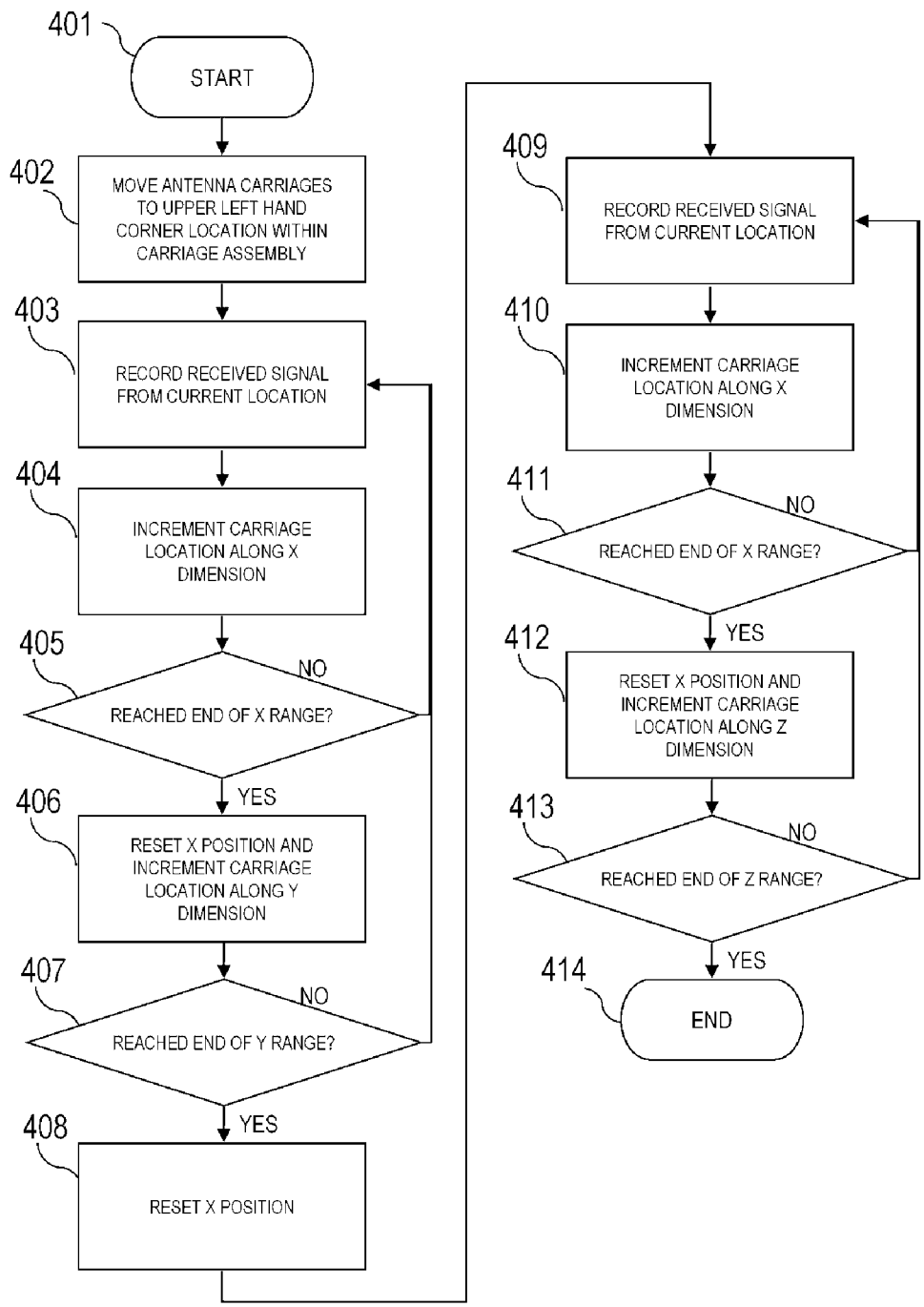
FIG. 4 is a flow chart illustrating the method by which the embodiment of FIG. 2 is determines optimal antenna placement.

FIG. 4 is a flow chart illustrating the method by which the embodiment of FIG. 2 determines optimal antenna placement. Execution is initiated in 401, corresponding to step 307 of FIG. 3. At step 402, the system moves the antenna carriages to their upper left-hand positions within the carriage assembly represented by 0 in each of the x, y, and z dimensions. At step 403, the system records the signal received by the RFID tag antenna with the current positions of the antenna carriages. At step 404, the system increments the RFID antenna carriage location along the x dimension. At step 405, the system tests if the carriage has reached the end of the x range. If it has not, the system continues at step 403. If the limit of the x range has been reached, then the position of the RFID antenna carriage is reset to 0 and the carriage location is incremented along the y dimension. At step 407 the system performs a test to determine if the end of the y range has been reached. If it has not, then the system continues at step 403. If the end of the y range has been reached, then the x position is reset to 0 at step 408. At step 409 the system records the signal received by the RFID tag antenna with the current positions of the antenna carriages. At step 410, the system increments the RFID antenna carriage location along the x dimension. At step 411, the system tests if the carriage has reached the end of the x range. If it has not, the system continues at step 409. If the limit of the x range has been reached, then the position of the RFID antenna carriage is reset to 0 and the carriage location is incremented along the z dimension. At step 413 the system performs a test to determine if the end of the z range has been reached. If it has not, then the system continues at step 409. If it has, then the entire range of the system has been scanned and an optimal placement for the RFID tag antenna determined, and operation ends at step 414.

What is claimed is:

1. A system for optimally placing radio frequency identification (RFID) antennas comprising:
   an antenna carriage assembly that holds one or more RFID tag antennas at a known position and orientation with respect to one or more RFID interrogator antennas and one or more objects;
   a signal generator which transmits a reference signal of known characteristics to the one or more RFID interrogator antennas; and
   one or more signal measuring devices selected from the group consisting of oscilloscopes, spectrum analyzers, and multi-purpose signal measuring devices, connected to the one or more RFID interrogator antennas held by the antenna carriage assembly such that the received signal may be examined to determine the optimal placement of the one or more RFID tag antennas with respect to the one or more RFID interrogator antennas and the one or more objects.

2. A system according to claim 1 wherein the one or more RFID tag antennas, the one or more RFID interrogator antennas, and the one or more objects are moved manually.

3. A system according to claim 1 wherein at least one of the group of the one or more RFID tag antennas and the one or more RFID interrogator antennas and the one or more objects is moved by the antenna carriage assembly.

4. A method for optimally placing RFID antennas in a systen including one or more RFID tag antennas, one or more RFID interrogator antennas, a signal generator, one or more objects, and one or more signal measuring devices selected from the group consisting of oscilloscopes, spectrum analyzers, and multi-purpose signal measuring devices comprising steps of:
   placing one or more objects with respect to one ore more RFID tag antennas and one or more RFID interrogator antennas;
   exhaustively moving the one or more RFID tag antennas with respect to the one or more objects and one or more RFID interrogator antennas;
   broadcasting the signal generated by the signal generator via the one or more RFID interrogator antennas;
   recording the location of the one or more RFID tag antennas along with the associated signal received from the one or more RFID tag antennas as presented by the signal measuring devices selected from the group consisting of oscilloscopes, spectrum analyzers, and multi-purpose signal measuring devices; and
   selecting the optimal placement for the one or more RFID tag antennas with respect to the one or more RFID interrogator antennas and one or more objects from the recorded signals.

5. A method according to claim 4 wherein at least one of the group of the one or more RFID tag antennas and the one or more RFID interrogator antennas and the one or more objects is moved manually.

6. A method according to claim 4 wherein at least one of the one or more RFID tag antennas, the one or more RFID interrogator antennas, and the one or more objects are moved by the antenna carriage assembly.

* * * * *